(12) United States Patent
Arocena De La Rua et al.

(10) Patent No.: US 8,297,932 B2
(45) Date of Patent: Oct. 30, 2012

(54) BLADE INSERT

(75) Inventors: Ion Arocena De La Rua, Sarriguren (ES); Eneko Sanz Pascual, Sarriguren (ES); Sandra Arroz Collado, Sarriguren (ES)

(73) Assignee: Gamesa Innovation & Technology, S.L., Sarriguren (ES)

( * ) Notice: Subject to any disclaimer, the term of this patent is extended or adjusted under 35 U.S.C. 154(b) by 796 days.

(21) Appl. No.: 12/492,162

(22) Filed: Jun. 26, 2009

(65) Prior Publication Data
US 2009/0324417 A1     Dec. 31, 2009

(30) Foreign Application Priority Data
Jun. 27, 2008   (ES) .................................. 200801926

(51) Int. Cl.
*F01D 5/14*          (2006.01)

(52) U.S. Cl. .................. 416/224; 416/229 R; 29/527.1; 29/889.7; 29/889.71

(58) Field of Classification Search .............. 416/223 R, 416/224, 225, 226, 229 R, 230, 232, 233; 29/527.1, 889.7, 889.71, 889.72
See application file for complete search history.

(56) References Cited

U.S. PATENT DOCUMENTS

| | | | |
|---|---|---|---|
| 2008/0145231 A1* | 6/2008 | Llorente Gonzales et al. | 416/243 |
| 2009/0208341 A1* | 8/2009 | Llorente Gonzalez et al. | 416/223 R |

FOREIGN PATENT DOCUMENTS

WO    WO 2006103307 A2 *  10/2006

* cited by examiner

*Primary Examiner* — Edward Look
*Assistant Examiner* — Jason Davis
(74) *Attorney, Agent, or Firm* — Ladas & Parry LLP

(57) ABSTRACT

Blade insert arranged inside the blade walls so that the joint between the insert and composite (1) is a double shear joint. The insert is made up of two defined parts, the head (3, 3') and the body, which are joined together by joint elements (5) that define a double wall body (6, 6'). The joint between the insert and pultruded material (2) is made with an adhesive chemical joint (9). After making the joint, the assembly made up by the inserts and pultrusion profiles (2) is fitted into the blade walls during its manufacturing process and material curing.

9 Claims, 2 Drawing Sheets

BLADE INSERT

OBJECT OF THE INVENTION

The invention describes an insert for a wind turbine blade according to the preamble in the first claim.

BACKGROUND OF THE INVENTION

Wind turbines blades are typically joined to the wind turbine hub with a mechanical multipoint joint, presented with stressed screws. Likewise, the blades divided into several modules can be assembled with mechanical joints between metal parts called inserts. The basic function of these blade root joint elements and the intermediate joint elements is transferring traction and/or compression loads transmitted from the blade laminations.

The nearest state-of-the-art corresponds to patent EP 18789155 where metal inserts axially housed in blade module walls are presented, where this wall is made of a composite lamination with a series of holes. The structural joint between the composite and the inserts is carried out with chemical means (adhesive) and is defined as a single shear joint, as each side of the insert is in contact with one of the sides of the hole in the composite.

However, the transfer of traction and/or compression loads produced in the blade's laminations as a consequence of the loads caused in the blade by the action of the wind are very big. This problem could be solved reinforcing the module walls with more fibre and large inserts, but this excess weight in the blades would unacceptably increase loads in the wind turbine.

DESCRIPTION OF THE INVENTION

To achieve a suitable transfer of the loads, a specific insert is defined that is arranged in such a way inside the blade walls that the joint between insert and composite forms a double shear joint. The insert is made up of two defined parts, the head and the body, which are joined together by external joint elements that define a double wall body. On the other hand, the wall of the modules that make up the blade is made up of a sandwich lamination the external skin of which is made out of two composite laminations and the inside of which is made up by carbon fibre pultrusion profiles and square section.

BRIEF DESCRIPTION OF THE FIGURES

In order to explain the joint of the insert and the composite, as well as the make-up of the insert itself, the following figures are included.

DESCRIPTION OF A PREFERRED EMBODIMENT

Figure 1:
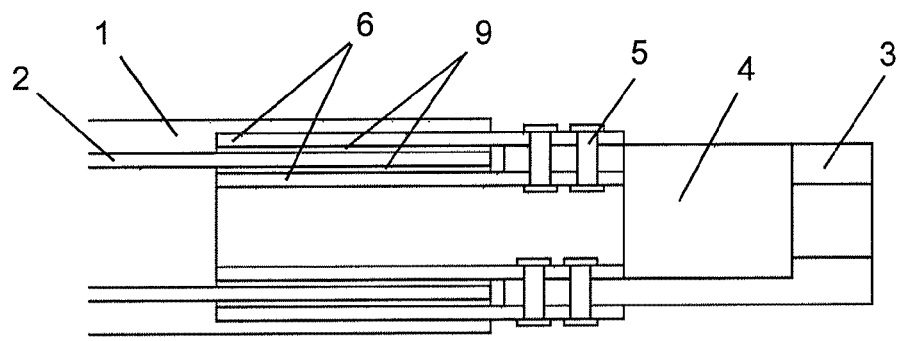
FIG. 1 shows a section of the insert joint and the blade wall lamination according to a first embodiment.

The invention consists of two practical embodiments, the first of which is shown in FIG. 1. The insert is arranged on one side and the sandwich lamination on the other. The sandwich lamination is common to both embodiments while the insert is different in each of them.

According to FIG. 1, the sandwich is made up of a composite sandwich (1) and a pultrusion profile (2) that makes up the core.

The insert is joined to the pultrusion profile (2) by a chemical joint (adhesive) (9) which joins the double wall (6, 6') of the insert to the two faces of the pultrusion profile. In this way, a double shear joint between the insert and the profile is obtained. The assembly made up of the insert and the profile is fitted into the blade walls, forming part of the sandwich structure made up by the two laminations (1) and the pultrusion profiles (2).

The insert is made up of two parts joined together, the head of the insert (3, 3') and the body of the insert. The head of the insert (3, 3') has a top gap (4) where the axial holes are accessed (not shown in the figures) used for fastening to other inserts. The joint between the head (3, 3') and the body is carried out with some external elements (5) that fasten both parts. The insert body is made up of a double wall (6, 6') in the two present practical embodiments.

Figure 2:
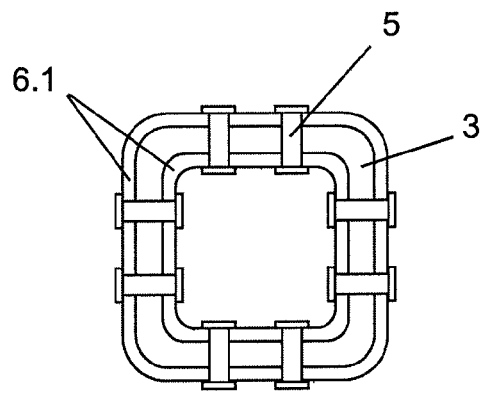
FIG. 2 shows a transversal section of the insert according to the practical embodiment of the two tubes.
Figure 3:
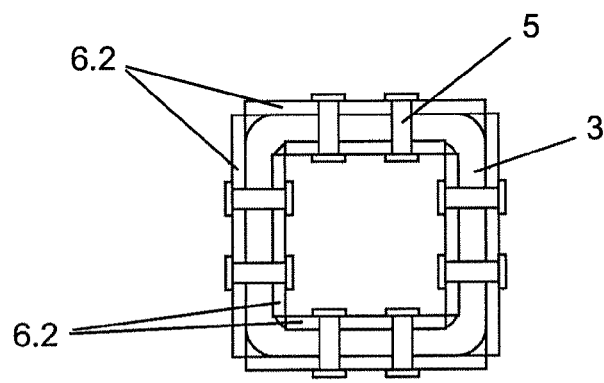
FIG. 3 shows a transversal section of the insert according to the practical embodiment of the independent plates.

As shown in FIG. 2, the body of the double wall (6) of the insert is made up of two tubular elements (6.1). Another alternative is the one shown in FIG. 3, where the double wall body (6) is made up by sheets (6.2) that are joined to the outside and inside of the head (3) of the insert.

Figure 4:
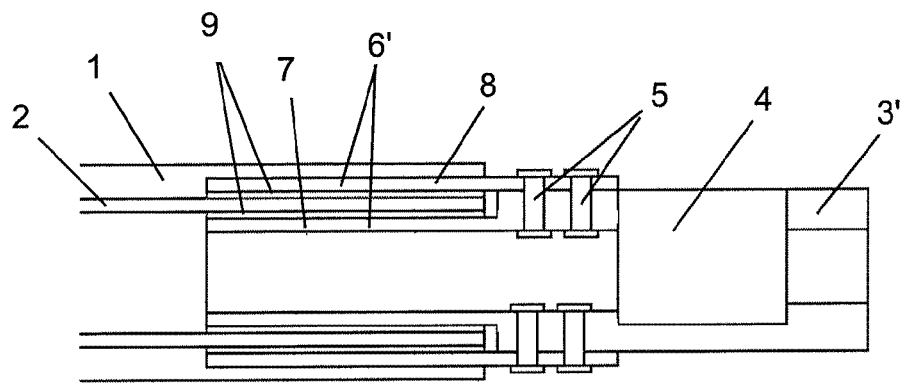
FIG. 4 shows a section of the insert joint and the blade wall lamination according to a second embodiment.

The second practical embodiment uses the same sandwich lamination with a first composite lamination (1) and a core made up of a pultrusion profile (2). The insert also has a head (3') with its corresponding top gap (4) to access the insert's fastening elements (not shown in the figure). In this embodiment, the insert body is made up of a extension (7) of the head (3'), combined with a single body (8) and the corresponding external fastening elements (5). All this constitutes a double wall (6'), again, as shown in FIG. 4.

Figure 5:
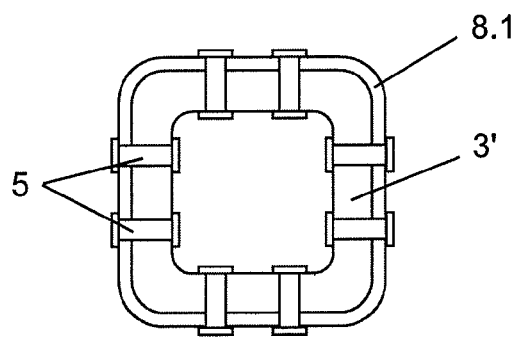
FIG. 5 shows a transversal section of the insert according to the practical embodiment of a single tube.
Figure 6:
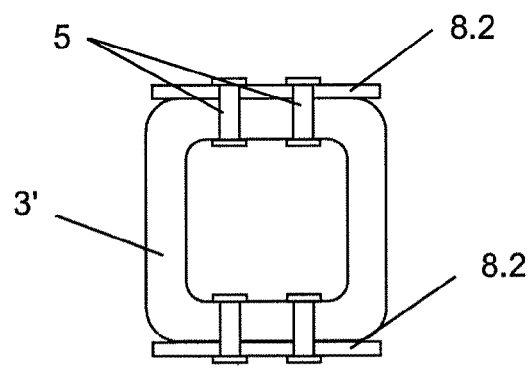
FIG. 6 shows a transversal section of the insert according to the practical embodiment of the use of a top plate and another bottom plate.

The single body (8) that constitutes the double wall (6') in combination with the extension (7) of the head of the insert (3') is a hollow tube (8.1) that is arranged on the outside of the insert, as shown in FIG. 5. Another possible alternative is the one shown in FIG. 6, where there is a considerable reduction in material as it only uses sheets (8.2) at the top and the bottom to make a double wall (6') only in these parts.

The method for placing the insert inside the composite sandwich is characterised by the fact that the insert and pultrusion profile (2) are chemically joined with adhesive (9) before manufacturing the blade walls. This process may be carried out positioning the parts together and a later injection of adhesive in the space between parts or applying adhesive on one of the parts and positioning the rest in their position.

When the joint between the insert and pultrusion profile (2) has been made and the adhesive (9) has cured, the assembly made up of the inserts and pultrusion profiles (2) is fitted into the blade wall lamination during the wall manufacturing process: in a first step, a series of layers of composite (1) are positioned, and then the assemblies made up of the insert and pultrusion profile (2) are positioned, and finally another series of composite layers (1) is placed on top of these assemblies. During the composite (1) curing process, its resin sticks to the pultrusion profiles (2) joining the profiles to the rest of blade wall lamination.

The invention claimed is:

1. A blade insert fitted to the inside of a sandwich lamination made up by composite skins and pultruded material core in the shape of a cell, comprising the insert includes a head (3, 3') and a double wall body (6, 6') joined together with external elements (5), the double wall body (6, 6') is inserted inside the sandwich lamination with a pultruded fibre (2) between the two walls a joint between the insert and pultruded material is made with an adhesive chemical joint (9).

2. Blade insert according to claim 1, characterised by the double wall body (6) being independent of the head (3).

3. Blade insert according to claim 2, characterised by the double wall body (6) being made up of two tubes (6.1).

4. Blade insert according to claim 2, characterised by the double wall body (6) being made up of at least two external sheets and at least two internal sheets (6.2).

5. Blade insert according to claim 2, characterised by the double wall body (6) being made up of an assembly of external and internal laminations (6.2) arranged in the shape of a square.

6. Blade insert according to claim 1, characterised by the double wall body (6') being made up of a extension (7) of the head (3') and a single body (8).

7. Blade insert according to claim 6, characterised by the single wall body (8) being made up by a single tube (8.1).

8. Blade insert according to claim 6, characterised by the single body (8) being at least made up by one sheet (8.2) on the top part and another (8.2) on the bottom part.

9. A method for positioning an insert inside a composite sandwich lamination with pultrusion profiles in its core, comprising injecting an adhesive into a prior assembly of an insert and the pultrusion profile until the gaps between the double walls (6, 6') of the insert and the pultrusion profile (2) inside it are filled curing the adhesive (9)

fitting the assembly made up of the insert and p rofiles during the lamination process of the blade walls.

* * * * *